(12) United States Patent
Wang et al.

(10) Patent No.: US 9,005,842 B2
(45) Date of Patent: *Apr. 14, 2015

(54) PROTON EXCHANGE MEMBRANE COMPOSITION

(75) Inventors: Tsung-Hsiung Wang, Dali (TW); Jing-Pin Pan, Hsinchu Hsien (TW); Wen-Chin Lee, Taipei (TW); Yueh-Wei Lin, Hsinchu (TW); Ya-Tin Hsu, Taipei (TW); Chung-Liang Chang, Hsinchu (TW); Chih-Jer Shih, Tainan (TW)

(73) Assignee: Industrial Technology Research Institute (TW)

( * ) Notice: Subject to any disclaimer, the term of this patent is extended or adjusted under 35 U.S.C. 154(b) by 1472 days.

This patent is subject to a terminal disclaimer.

(21) Appl. No.: 12/546,004

(22) Filed: Aug. 24, 2009

(65) Prior Publication Data

US 2010/0167101 A1    Jul. 1, 2010

(30) Foreign Application Priority Data

Dec. 31, 2008   (TW) ................................ 97151788 A

(51) Int. Cl.

| | |
|---|---|
| H01M 8/10 | (2006.01) |
| C08G 73/12 | (2006.01) |
| C08J 5/22 | (2006.01) |
| C08L 79/08 | (2006.01) |
| H01M 4/92 | (2006.01) |

(52) U.S. Cl.
CPC ............. *H01M 8/1041* (2013.01); *C08G 73/12* (2013.01); *C08J 5/2256* (2013.01); *C08J 2400/202* (2013.01); *C08L 79/085* (2013.01); *H01M 4/92* (2013.01); *H01M 8/1023* (2013.01); *H01M 8/1025* (2013.01); *H01M 8/1027* (2013.01); *H01M 8/103* (2013.01); *H01M 8/1032* (2013.01); *H01M 8/1048* (2013.01); *Y02E 60/521* (2013.01); *C08J 2371/12* (2013.01)

(58) Field of Classification Search
None
See application file for complete search history.

(56) References Cited

U.S. PATENT DOCUMENTS 6,432,613 B1 * 8/2002 Chen et al. ............... 430/280.1
8,501,368 B2 * 8/2013 Pan et al. ..................... 429/493

(Continued)

FOREIGN PATENT DOCUMENTS

| JP | 2010-126723 | 6/2010 |
| JP | 2010-155990 | 7/2010 |
| TW | 200827026 | 7/2008 |

OTHER PUBLICATIONS

Office Action dated Feb. 25, 2013 from corresponding application No. TW 097151788.

(Continued)

*Primary Examiner* — Patrick Ryan
*Assistant Examiner* — Adam A Arciero
(74) *Attorney, Agent, or Firm* — Lowe Hauptman & Ham, LLP

(57) ABSTRACT

Proton exchange membrane compositions having high proton conductivity are provided. The proton exchange membrane composition includes a hyper-branched polymer, wherein the hyper-branched polymer has a DB (degree of branching) of more than 0.5. A polymer with high ion conductivity is distributed uniformly over the hyper-branched polymer, wherein the hyper-branched polymer has a weight ratio equal to or more than 5 wt %, based on the solid content of the proton exchange membrane composition.

11 Claims, 6 Drawing Sheets

(56) References Cited

U.S. PATENT DOCUMENTS

2005/0244696 A1* 11/2005 Kuromatsu et al. ............. 429/33
2010/0143767 A1* 6/2010 Wang et al. .................... 429/40

OTHER PUBLICATIONS

Office Action dated Feb. 28, 2012 from corresponding application No. JP 2009-293948.

* cited by examiner

PROTON EXCHANGE MEMBRANE COMPOSITION

CROSS REFERENCE TO RELATED APPLICATIONS

This application is based upon and claims the benefit of priority from the prior Taiwan Patent Application No. 97151788, filed on Dec. 31, 2008, the entire contents of which are incorporated herein by reference.

BACKGROUND OF THE INVENTION

1. Field of the Invention

The invention relates to a proton exchange membrane composition, and more particularly to a proton exchange membrane composition for high temperature conductivity.

2. Description of the Related Art

Fuel cells are well known and are commonly used to produce electrical energy by means of electrochemical reactions. Compared to conventional power generation apparatuses, fuel cells have advantages of causing less pollution, generating less noise, increased energy density and higher energy conversion efficiency. Fuel cells can be used in portable electronic products, home-use or plant-use power generation systems, transportation vehicles, military equipment, space industry application, large-sized power generation systems, etc.

For example, in the case of a proton exchange membrane fuel cell (PEMFC), hydrogen is supplied to an anode and an oxidation reaction occurs in the presence of an anode catalyst layer, thus protons and electrons are generated. The protons reach the cathode through the proton exchange membrane. Meanwhile, in the cathode, electrons from the anode via the external circuit are reduced to oxygen supplied to the cathode and protons by reduction, producing water.

FIG. 1A shows an exploded view of conventional fuel cell 10 with a membrane electrode assembly, and FIG. 1B shows a cross-section view of FIG. 1A. As shown in FIGS. 1A and 1B, the conventional fuel cell 10 can comprise a membrane electrode assembly 12 comprising a catalytic anode film 121, a proton exchange membrane 122, and a catalytic cathode film 123, wherein a binder composition 124 can be used to combine the catalytic anode film 121 and the proton exchange membrane 122, and/or the catalytic cathode film 123 and the proton exchange membrane 122. The conventional fuel cell 10 further comprises a bipolar plate 13 and two end electrode plates 11 for connection, wherein the bipolar plate 13 and the end electrode plates 11 comprises gas passages 111 and 131 for conducting hydrogen and oxygen into the membrane electrode assembly 12.

In general, conventional proton exchange membrane fuel cells (PEMFCs) include a Nafion-based proton exchange membrane. Since Nafion only exhibits acceptable electrical conductivity with high water content, the Nafion-based proton exchange membrane has an operating temperature of below 90° C. (70~80° C. in general).

In low operating temperatures however, proton exchange membrane fuel cells, have two key problems. First, platinum catalyst is apt to be reacted with minute amounts of CO existing in hydrogen gas, resulting in inferior catalytic efficiency. Second, water management is difficult to control. Inefficient water management may lead to the anode becoming prone to drying and the cathode to flooding, resulting in oxygen not being able to contact the surface of the catalyst, thus limiting proton transport.

Proton conduction in proton exchange membranes is achieved by either the vehicular or Grotthuss mechanism.

In the vehicular mechanism, protons transfer through the proton exchange membrane together with water molecules ($H_2O$) to form hydronium ion ($H_3O^+$). Therefore, proton conductivity depends on the water retention ability of the proton exchange membrane. However, water molecules are apt to scatter at high temperatures. The proton exchange membranes including materials with hydrogen sulfate groups (such as Nafion) transfer proton based on the vehicular mechanism.

In the Grotthuss mechanism, the hydrogen ions (protons) traverse the proton exchange membrane by hopping from different proton acceptor sites in the absence of water. In general, proton exchange membranes, based on the Grotthuss mechanism include Brönsted acid base pairs (ionic liquids) or are doped with excessive protonic acid. The proton conductivity and the operating temperature in the Grotthuss mechanism is a direct ratio (especially for temperatures higher than 130° C.). The polybenzimidazole proton exchange membranes have been an exponent of the proton exchange membranes based on the Grotthuss mechanism. However, the electrical conductivity of polybenzimidazole measured at 160° C. is less than that of the Nafion measured at 80° C.

Overall, to achieve high temperature proton conduction for proton exchange membranes, water retention ability is increased, chemical resistance is increased, flexibility is increased, and/or mechanical strength of the proton exchange membrane during high temperature operation is increased.

A proton exchange membrane, having polybenzimidazole (PBI) as a main component, doped with phosphoric acid or sulfuric acid, has been disclosed. The operating temperature of the PBI based proton exchange membrane can be 150~200° C., and the CO tolerance of the proton exchange membrane fuel cells can be enhanced to 1% at 160° C. The PBI-based proton exchange membrane, however, has an ion conductivity of 1 mS/cm (measured at 120° C.), lower than that of immersed Nafion-based proton exchange membrane (60 mS/cm measured at 80° C.). Further, the power density of PBI-based proton exchange membrane is also less than that of the Nafion-based proton exchange membrane.

Accordingly, a novel proton exchange membrane for membrane electrode assemblies for replacing the conventional Nafion-based proton exchange membrane is required.

BRIEF SUMMARY OF THE INVENTION

An exemplary embodiment of proton exchange membrane composition includes a hyper-branched polymer, wherein the hyper-branched polymer has a DB (degree of branching) of more than 0.5. A polymer with high ion conductivity is distributed uniformly over the hyper-branched polymer, wherein the hyper-branched polymer has a weight ratio equal to or more than 5 wt %, based on the solid content of the proton exchange membrane composition.

In an embodiment of the invention, the hyper-branched polymer comprises a polymer prepared by polymerizing a bismaleimide-containing compound with a barbituric acid.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
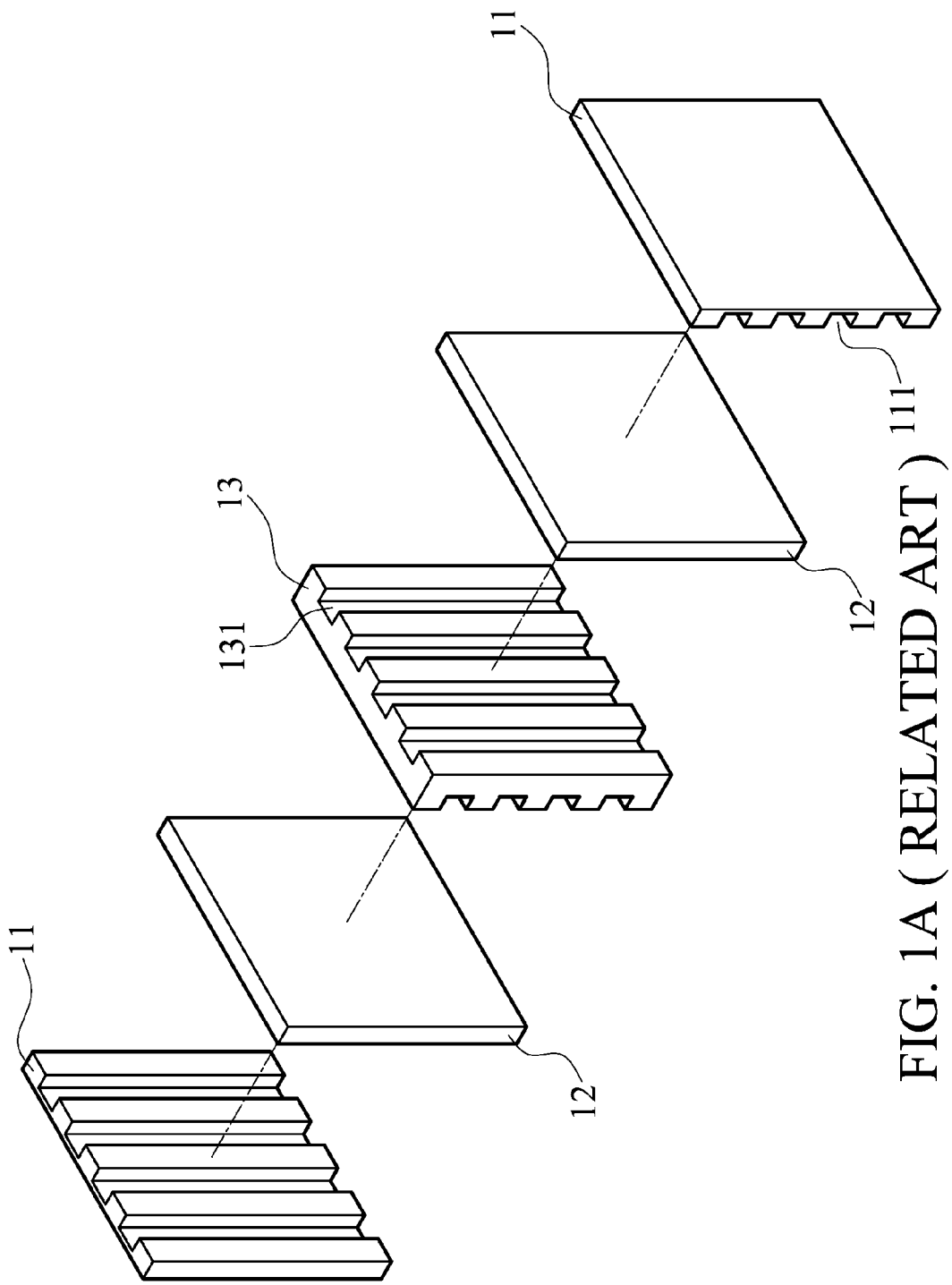
FIG. 1A is an exploded view of a conventional fuel cell with a membrane electrode assembly.
Figure 1B:
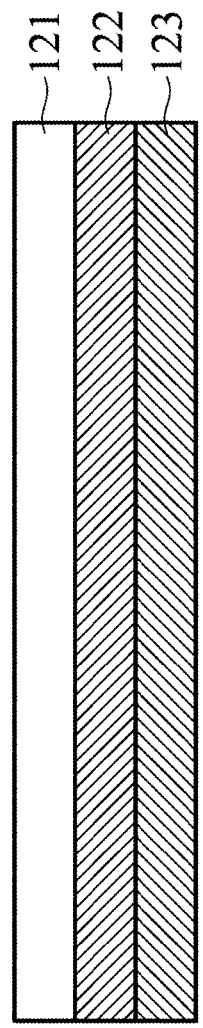
FIG. 1B is a cross section of the conventional fuel cell with a membrane electrode assembly as shown in FIG. 1A.

The following description is of the best-contemplated mode of carrying out the invention. This description is made for the purpose of illustrating the general principles of the invention and should not be taken in a limiting sense. The scope of the invention is best determined by reference to the appended claims.

The invention provides a proton exchange membrane including a hyper-branched polymer (such as the STOBA (self-terminated oligomer with hyper-branched architecture)) as a matrix and a polymer with high ion conductivity distributed uniformly over the hyper-branched polymer, constituting a semi interpenetrating network (semi-IPN) structure, having proton (or ion) channels, with high mechanical strength. Further, the proton exchange membranes of the invention have superior thermal resistance and structural strength than those of conventional proton exchange membranes.

The proton exchange membrane composition includes a hyper-branched polymer and a polymer with high ion conductivity distributed uniformly over the hyper-branched polymer, wherein the hyper-branched polymer has a DB (degree of branching) of more than 0.5.

The hyper-branched polymer according to the invention has a degree of branching (DB) of more than 0.5. The degree of branching (DB) is defined as the average fraction of branching groups per molecule, i.e., the ratio of terminal groups plus branched groups to the total number of terminal groups, branched groups, and linear groups. The degree of branching is expressed mathematically as follows:

$$DB=(\Sigma D+\Sigma T)/(\Sigma D+\Sigma L+\Sigma T),$$

where D represents the number of dendritic units (comprising at least three linkage bonds), L represents the number of linear units, and T represents the number of terminal units, as defined in Hawker, C. J.; Lee, R. Frchet, J. M. J., J. Am. Chem. Soc., 1991, 113, 4583.

In embodiments of the invention, the hyper-branched polymer comprises the STOBA (self-terminated oligomer with hyper-branched architecture), such as polymers prepared by polymerizing a bismaleimide-containing compound with a barbituric acid.

The bismaleimide-containing compound comprises substituted or unsubstituted bismaleimide monomer or substituted or unsubstituted bismaleimide oligomer. For examples, the bismaleimide-containing compound can be

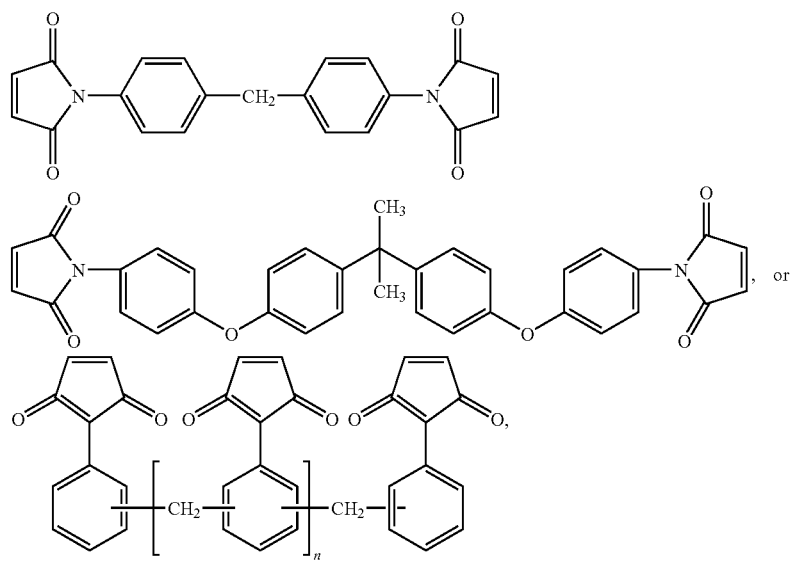

wherein n>1. In addition, at least one hydrogen atom bonded to the carbon atom of the aforementioned bismaleimide-containing compounds can be substituted optionally by fluorine, halogen atom, cyano group, —R", —CO$_2$H, —CO$_2$R", —COR", —R"CN, —CONH$_2$, —CONHR", —CONR$_{12}$, —OCOR" or OR, wherein R" can be selected from the group consisting of substituted or unsubstituted C$_1$-C$_{12}$ alkyl group, thioalkyl group, alkynyloxy group, alkoxy group, alkenyl group, alkynylene group, alkenyloxy group, aryl group, alkylaryl group, heteroaryl group, arylalkyl group, or combinations thereof. Further, the bismaleimide-containing compound can comprise

-continued

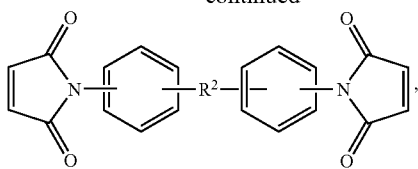

wherein R¹ may comprise —RCH₂— (alkyl), —RNH₂R—, —C(O)CH₂—, —CH₂OCH₂—, —C(O)—, —O—, —O—O—, —S—, —S—S—, —S(O)—, —CH₂S(O)CH₂—, —(O)S(O)—, —C₆H₄—, —CH₂(C₆H₄)CH₂—, —CH₂(C₆H₄)(O)—, phenylene, diphenylene, substituted phenylene or substituted diphenylene, R² comprises —RCH₂—, —C(O)—, —C(CH₃)₂—, —O—, —O—O—, —S—, —S—S—, —(O)S(O)— or —S(O)—. R may independently comprise hydrogen or $C_1$-$C_4$ alkyl. The bismaleimide-containing compound may be selected from the group consisting of N,N'-bismaleimide-4,4'-diphenylmethane, [1,1'-(methylenedi-4,1-phenylene)bismaleimide], [N,N'-(1,1'-biphenyl-4,4'-diyl)bismaleimide], [N,N'-(4-methyl-1,3-phenylene)bismaleimide], [1,1'-(3,3'dimethyl-1,1'-biphenyl-4,4'-diyl)bismaleimide], N,N'-ethylenedimaleimide, [N,N'-(1,2-phenylene)dimaleimide], [N,N'-(1,3-phenylene)dimaleimide], N,N'-thiodimaleimide, N,N'-dithiodimaleimide, N,N'-ketonedimaleimide, N,N'-methylene-bis-maleinimide, bis-maleinimidomethyl-ether, [1,2-bis-(maleimido)-1,2-ethandiol], N,N'-4,4'-diphenylether-bis-maleimid and [4,4'-bis(maleimido)-diphenylsulfone].

Further, the barbituric acid can be

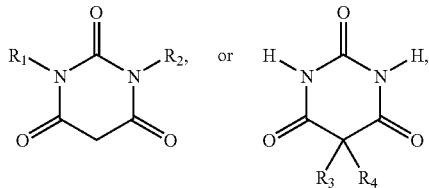

wherein R₁, R₂, R₃ and R₄ may be the same or different and comprise H, CH₃, C₂H₅, C₆H₅, CH(CH₃)₂, CH₂CH(CH₃)₂, CH₂CH₂CH(CH₃)₂, or

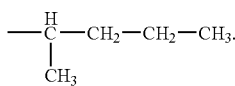

STOBA (self-terminated oligomer with hyper-branched architecture) can be prepared by polymerizing a bismaleimide-containing compound with a barbituric acid in the presence of an initiator and a solvent. In particular, the molar ratio of the bismaleimide-containing compound and barbituric acid can be 20:1 to 1:5, preferably 5:1 to 1:2.

The solvent can be γ-butyrolactone (GBL), 1-methyl-2-pyrrolidinone (NMP), dimethylacetamide (DMAC), N,N-dimethylformamide (DMF), dimethyl sulfoxide (DMSO), dimethylamine (DMA), tetrahydrofuran (THF), methyl ethyl ketone (MEK), propylene carbonate (PC), water, isopropyl alcohol (IPA), or combinations thereof.

According to the present invention, the at least one initiator employed is an agent, such as peroxide initiators or azo initiators, which generates, upon activation, free radical species through decomposition, and can be 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-(N)-(1,1)-bis(hydroxymethyl)-2-hydroxyethyl]propionamide, 2,2'-azobis[2-methyl-N-hydroxyethyl)]propionamide, 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl]propionamide, 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide)dihydrate, 2,2'-azobis(2,2,4-trimethylpentane), 2,2'-azobis(2-methylpropane), dilauroyl peroxide, tertiary amyl peroxides, tertiary amyl peroxydicarbonates, t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, potassium peroxydisulfate, ammonium peroxydisulfate, di-tert butyl peroxide, di-t-butyl hyponitrite, dicumyl hyponitrite or combinations thereof.

In embodiments of the invention, the polymer with high ion conductivity can be Nafion, sulfonated poly(ether ether ketone)(s-PEEK), sulfonated polyimides (s-PI), phosphoric acid/polybenzimidazole polymer (p-PBI), sulfonated poly(phenylene oxide) (s-PPO), sulfonated poly(arylene ether sulfone) (s-PES), sulfonated poly(4-phenoxybenzoyl-1,4-phenylene) (s-PPBP), or combinations thereof.

In embodiments of the invention, the method for preparing a proton exchange membrane of the invention can comprise dissolving the hyper-branched polymer and the polymer with high ion conductivity in a solvent to prepare a proton exchange membrane composition, and coating solvent on a substrate to from the proton exchange membrane. The solvent can be γ-butyrolactone (GBL), 1-methyl-2-pyrrolidinone (NMP), dimethylacetamide (DMAC), N,N-dimethylformamide (DMF), dimethyl sulfoxide (DMSO), dimethylamine (DMA), tetrahydrofuran (THF), methyl ethyl ketone (MEK), propylene carbonate (PC), water, isopropyl alcohol (WPA), or combinations thereof.

It should be noted that the hyper-branched polymer has a weight ratio equal to or more than 5 wt %, based on the solid content of the proton exchange membrane composition. Further, the hyper-branched polymer can have a weight ratio of 1-30 wt %, preferably 5-25 wt %, based on the solid content of the proton exchange membrane composition. The proton exchange membrane composition can further comprise a catalyst, such as platinum, ruthenium, or platinum-ruthenium alloy.

Figure 2:
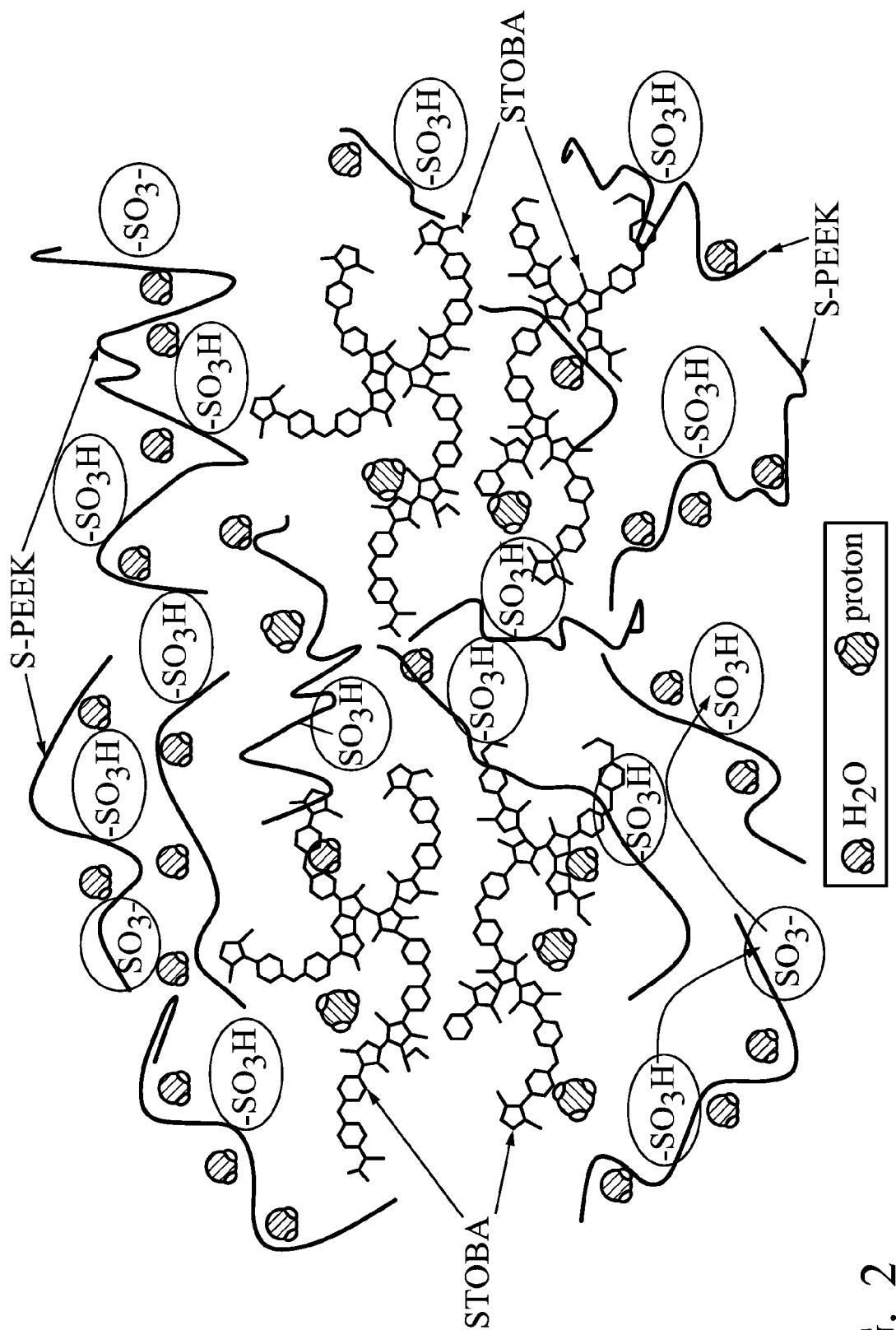
FIG. 2 is a partial schematic drawing of the proton exchange membrane of an embodiment of the invention.

FIG. 2 is a partial schematic drawing of the proton exchange membrane, illustrating the conduction mechanism of water molecules and protons within the hyper-branched polymer (such as the STOBA) and the polymer with high ion conductivity (such as the s-PEEK), wherein the s-PEEK has a chain length of 20 Å, and the hyper-branched polymer comprises a bismaleimide moiety having a molecular weight of between 9000 and 12000. Particularly, the proton exchange membrane made from the proton exchange membrane composition can possess an operating temperature of between 25° C. to 150° C.

Figure 3:
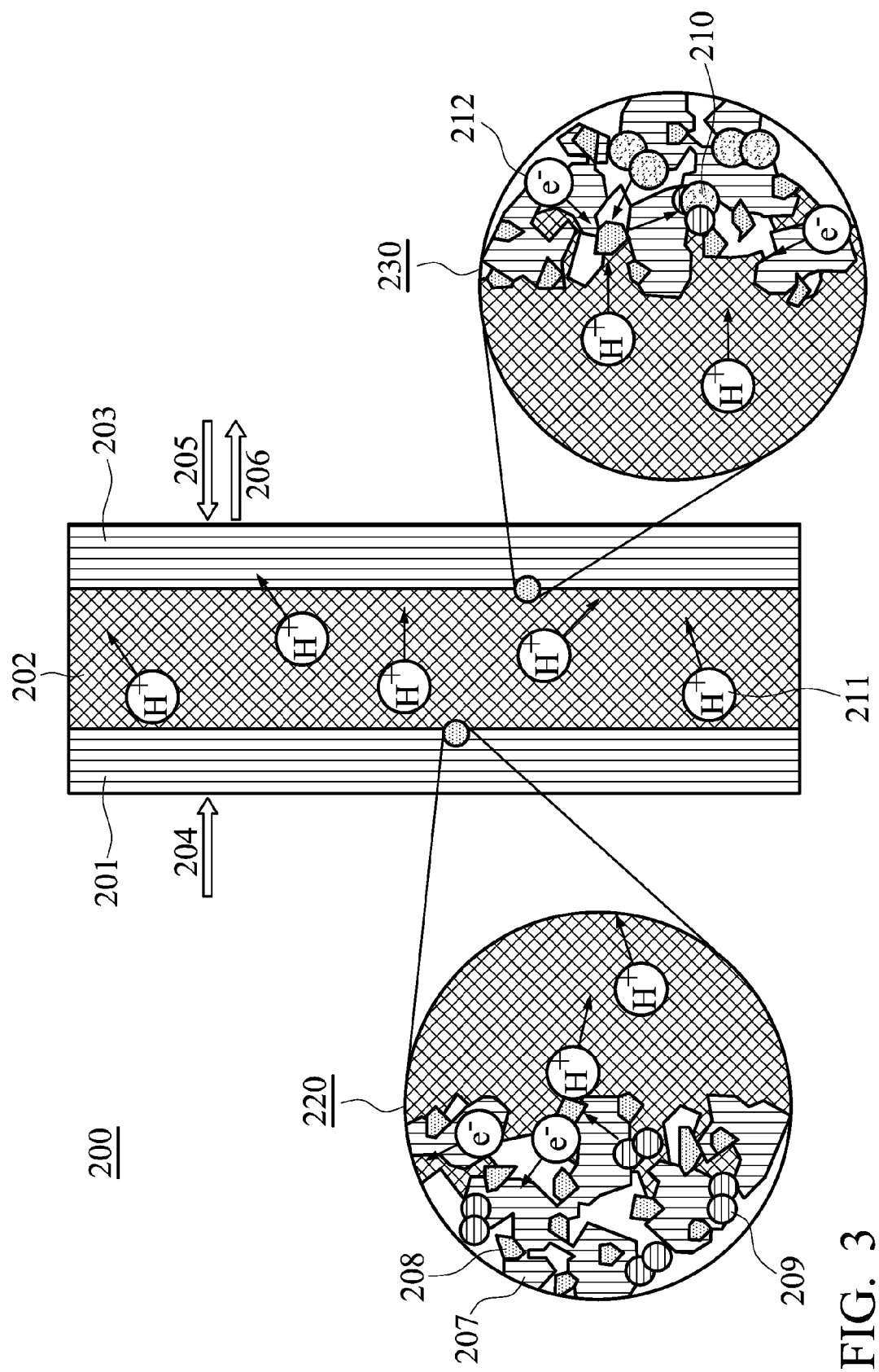
FIG. 3 is a schematic drawing of a membrane electrode assembly of an embodiment of the invention, employing the proton exchange membrane shown in FIG. 2.

Further, referring to FIG. 3, the membrane electrode assembly 200 of an embodiment of the invention comprises a proton exchange membrane 202 as disclosed in FIG. 2. The membrane electrode assembly 200 further comprises a catalytic anode 201 and a catalytic cathode 203, wherein the proton exchange membrane 202 is disposed between the catalytic anode 201 and the catalytic cathode 203

As shown in FIG. 3, the hydrogen gas 204 fed into the catalytic anode 201 reacts with the catalyst 208 adhered on the carbonaceous material 207 to produce protons 207, as shown in following reaction formula:

$$H_2 \rightarrow 2H^+ + 2e^-$$

The incoming oxygen gas 205 from the catalytic cathode 203 reacts with the protons 211 and the electrons 212 of the proton exchange membrane 202 via the proton exchange membrane contact region 230, producing water 206. The reaction formula is shown below:

$$\tfrac{1}{2}O_2 + 2H^+ + 2e^- \rightarrow H_2O$$

Accordingly, the invention provides a proton exchange membrane including a hyper-branched polymer (such as the STOBA (self-terminated oligomer with hyper-branched architecture)) as a matrix and a polymer with high ion conductivity distributed uniformly over the hyper-branched polymer, constituting a semi interpenetrating network (semi-IPN) structure, with a comb-like structure and proton channel, exhibiting water retention ability, chemical resistance, mechanical strength, thermal resistance, toughness, and proton conductivity and preventing acid from leaking out.

The following examples are intended to illustrate the invention more fully without limiting their scope, since numerous modifications and variations will be apparent to those skilled in the art.

Preparation of Hyper-Branched Polymer

Example 1

18.6668 g of 4,4'-bismaleimidodi-phenylmethane was dissolved in 50 ml of γ-butyrolactone (GBL) as solvent and heated to 130° C. with stirring until the bismaleimide monomer was completely dissolved. Next, 1.3341 g of 2,4,6-trioxohexahydropyrimidine (barbituric acid) was dissolved in 30 ml of γ-butyrolactone (GBL) and progressively added to the 4,4'-bismaleimidodi-phenylmethane/γ-butyrolactone in 8 batches (30-min interval) and stirred to perform bismaleimide polymerization. After addition of the barbituric acid batches were completed, the polymerization continuously proceeded for 4 hrs to form hyper-branched polymer (A). The molar ratio of the bismaleimide and barbituric acid was 5:1, and solid content thereof was 20 wt %.

Example 2

20.0002 g of 4,4'-bismaleimidodi-phenylmethane was dissolved in 62 ml of γ-butyrolactone (GBL) as solvent and heated to 130° C. with stirring until the bismaleimide monomer was completely dissolved. Next, 3.5752 g of 2,4,6-trioxohexahydropyrimidine (barbituric acid) was dissolved in 32 ml of γ-butyrolactone (GBL) and progressively added to the 4,4'-bismaleimidodi-phenylmethane/γ-butyrolactone in 4 batches (60-min interval) and stirred to perform bismaleimide polymerization. After addition of the barbituric acid batches were completed, the polymerization continuously proceeded for 4 hrs to form hyper-branched polymer (B). The molar ratio of the bismaleimide and barbituric acid was 2:1, and solid content thereof was 20 wt %.

Example 3

17.8712 g of 4,4'-bismaleimidodi-phenylmethane was dissolved in 50 ml of γ-butyrolactone (GBL) as solvent and heated to 130° C. with stirring until the bismaleimide monomer was completely dissolved. Next, 6.9090 g of 2,4,6-trioxohexahydropyrimidine (barbituric acid) was dissolved in 30 ml of γ-butyrolactone (GBL) and progressively added to the 4,4'-bismaleimidodi-phenylmethane/γ-butyrolactone in 8 batches (30-min interval) and stirred to perform bismaleimide polymerization. After addition of the barbituric acid batches were completed, the polymerization continuously proceeded for 4 hrs to form hyper-branched polymer (C). The molar ratio of the bismaleimide and barbituric acid was 1:1, and solid content thereof was 20 wt %.

Example 4

19.9991 g of 4,4'-bismaleimidodi-phenylmethane was dissolved in 62 ml of propylene carbonate (PC) as solvent and heated to 130° C. with stirring until the bismaleimide monomer was completely dissolved. Next, 3.5757 g of 2,4,6-trioxohexahydropyrimidine (barbituric acid) was dissolved in 32 ml of propylene carbonate (PC) and progressively added to the 4,4'-bismaleimidodi-phenylmethane/propylene carbonate in 4 batches (60-min interval) and stirred to perform bismaleimide polymerization. After addition of the barbituric acid batches were completed, the polymerization continuously proceeded for 4 hrs to form hyper-branched polymer (D). The molar ratio of the bismaleimide and barbituric acid was 2:1, and solid content thereof was 20 wt %.

Example 5

19.9997 g of 4,4'-bismaleimidodi-phenylmethane was dissolved in 72 ml of propylene carbonate (PC) as solvent and heated to 130° C. with stirring until the bismaleimide monomer was completely dissolved. Next, 7.1498 g of 2,4,6-trioxohexahydropyrimidine (barbituric acid) was dissolved in 36 ml of γ-butyrolactone (GBL) and progressively added to the 4,4'-bismaleimidodi-phenylmethane/propylene carbonate in 8 batches (60-min interval) and stirred to perform bismaleimide polymerization. After addition of the barbituric acid batches were completed, the polymerization continuously proceeded for 4 hrs to form hyper-branched polymer (E). The molar ratio of the bismaleimide and barbituric acid was 1:1, and solid content thereof was 20 wt %.

Preparation of Polymer with High Ion Conductivity

Example 6

Sulfonated Poly(Ether Ether Ketone)

Vitrex PF 450 (poly(ether ether ketone) powder) was placed in an oven, and then baked for 2 hours at 110□ The baked Vitrex PRF 450 was placed in a round bottom flask, and concentrated sulfuric acid (95 to 98%) was gradually poured into the flask while bathing. The weight ratio of the Vitrex PF 450 to the sulfuric acid was 1:10. Stirring mechanically, rotating at 9 rpm and heating to 45□, nitrogen gas was introduced into the reaction. Duration of the reaction was 7 hours. After the reaction time was completed, the solution was poured into ice water while stirring, to form the s-PEEK precipitate. Then, the s-PEEK precipitate was washed with deionized water to obtain a solution with pH>6. The obtained s-PEEK was placed in an oven set at 80□, which was then set to 110□, and vacuum was applied for two hours to obtain a yellow solid of the s-PEEK (63% sulfonation) after water was mostly removed. The synthesis equation of the above reaction is described as below:

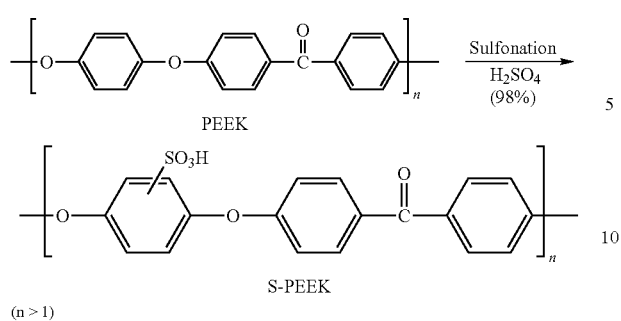

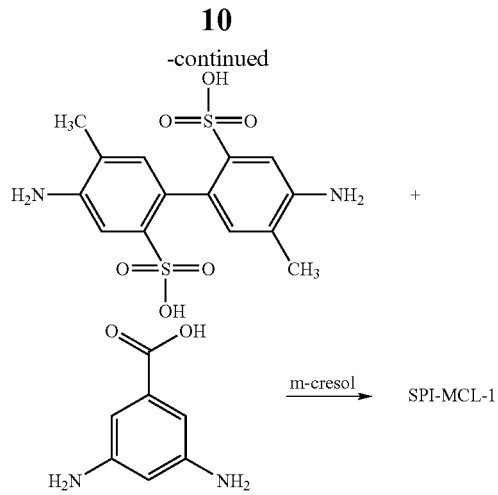

The obtained s-PEEK was further dissolved in a solvent, such as NMP.

According to embodiments of the invention, the sulfonation of the s-PEEK preferably has a range between 50-70%. If the sulfonation of the s-PEEK is lower than 50%, the s-PEEK would have inferior electrical conductivity. Meanwhile, if the sulfonation of the s-PEEK is higher than 50%, the s-PEEK would be apt to melt at fusing temperatures.

Example 7

Sulfonated Polyimide 280 g of m-cresol and 7.29 g (0.02 mole) 4,4'-Dimethyl-2,2'-biphenyldisulfonic acid were disposed in a reaction bottle. Next, 5.35 g (0.053 mole) of triethylamine was added into the bottle and heated to 90° C. After stirring, the mixture was cooled to 30° C. Next, 10.5 g (0.039 mol) of 1,4,5,8-Naphthalene tetra-carboxylic dianhydride, 7.21 g (0.020 mol) of 4,4'-bis(4-amino-phenoxy)biphenyl, and 6.79 g (0.056 mole) of benzoic acid were added into the bottle. After heating at 80° C. for 3 hrs, the mixture was heated to 180° C. for 20 hrs. Herein, the viscosity and the heating temperature were in the direct ratio. After cooling to room temperature, a sulfonated polyimide (SPI-MCL-1) red solution with high viscosity was obtained (50% sulfonation). The synthesis equation of the above reaction was described as below:

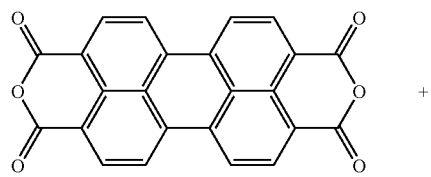

Preparation of Proton Exchange Membrane

Comparative Example 1

An s-PEEK Proton Exchange Membrane

The s-PEEK disclosed in Example 6 was placed in a serum bottle containing NMP solvent. The serum bottle was transferred to an oil bath at 80° C., and was stirred to dissolve the s-PEEK in the NMP solvent to form a solution with a solid content of 10 weight %. A scraper with a gap of 400 um was used to coat the s-PEEK solution onto a glass substrate with a coating speed of 17.8 cm/minutes, which was then placed into an oven set at 60□ for baking into a membrane. After filming, the temperature was increased to 110□ and vacuum was applied to remove residual solvent. Finally, the produced s-PEEK membrane was soaked in 60□, 0.5M sulfuric acid for 1 hour, and later transferred to 60□ deionized water to obtain an aqueous solution with pH>6. The obtained yellowish transparent s-PEEK membrane had a thickness of 25 to 35 um.

Example 8

An s-PEEK-STOBA Proton Exchange Membrane

The STOBA disclosed in Examples 1-5 were respectively mixed with the s-PEEK-NMP disclosed in Example 6 (20% solid content) with the molar ratio as disclosed in Table 1, obtaining yellowish transparent s-PEEK-STbBA solutions.

TABLE 1

The composition of various proton exchange membranes containing STOBA within various weight %.

| | STOBA | | | | | s-PEEK |
| --- | --- | --- | --- | --- | --- | --- |
| | Example 1 (wt %) | Example 2 (wt %) | Example 3 (wt %) | Example 4 (wt %) | Example 5 (wt %) | (dissolved in the NMP) wt % |
| s-PEEK-STOBA proton exchange membrane (1) | 5 | | | | | 95 |

TABLE 1-continued

The composition of various proton exchange membranes containing STOBA within various weight %.

|  | STOBA | | | | | s-PEEK |
|---|---|---|---|---|---|---|
|  | Example 1 (wt %) | Example 2 (wt %) | Example 3 (wt %) | Example 4 (wt %) | Example 5 (wt %) | (dissolved in the NMP) wt % |
| s-PEEK-STOBA proton exchange membrane (2) | 10 | | | | | 90 |
| s-PEEK-STOBA proton exchange membrane (3) | 15 | | | | | 85 |
| s-PEEK-STOBA proton exchange membrane (4) | 20 | | | | | 80 |
| s-PEEK-STOBA proton exchange membrane (5) | 30 | | | | | 70 |
| s-PEEK-STOBA proton exchange membrane (6) | 40 | | | | | 60 |
| s-PEEK-STOBA proton exchange membrane (7) | | 5 | | | | 95 |
| s-PEEK-STOBA proton exchange membrane (8) | | 10 | | | | 90 |
| s-PEEK-STOBA proton exchange membrane (9) | | 15 | | | | 85 |
| s-PEEK-STOBA proton exchange membrane (10) | | 20 | | | | 80 |
| s-PEEK-STOBA proton exchange membrane (11) | | 30 | | | | 70 |
| s-PEEK-STOBA proton exchange membrane (12) | | 40 | | | | 60 |
| s-PEEK-STOBA proton exchange membrane (13) | | | 5 | | | 95 |
| s-PEEK-STOBA proton exchange membrane (14) | | | 10 | | | 90 |
| s-PEEK-STOBA proton | | | 15 | | | 85 |

TABLE 1-continued

The composition of various proton exchange membranes containing STOBA within various weight %.

| | STOBA | | | | | s-PEEK |
|---|---|---|---|---|---|---|
| | Example 1 (wt %) | Example 2 (wt %) | Example 3 (wt %) | Example 4 (wt %) | Example 5 (wt %) | (dissolved in the NMP) wt % |
| exchange membrane (15) | | | | | | |
| s-PEEK-STOBA proton exchange membrane (16) | | 20 | | | | 80 |
| s-PEEK-STOBA proton exchange membrane (17) | | 30 | | | | 70 |
| s-PEEK-STOBA proton exchange membrane (18) | | 40 | | | | 60 |
| s-PEEK-STOBA proton exchange membrane (19) | | | 5 | | | 95 |
| s-PEEK-STOBA proton exchange membrane (20) | | | 10 | | | 90 |
| s-PEEK-STOBA proton exchange membrane (21) | | | 15 | | | 85 |
| s-PEEK-STOBA proton exchange membrane (22) | | | 20 | | | 80 |
| s-PEEK-STOBA proton exchange membrane (23) | | | 30 | | | 70 |
| s-PEEK-STOBA proton exchange membrane (24) | | | 40 | | | 60 |
| s-PEEK-STOBA proton exchange membrane (25) | | | | 5 | | 95 |
| s-PEEK-STOBA proton exchange membrane (26) | | | | 10 | | 90 |
| s-PEEK-STOBA proton exchange membrane (27) | | | | 15 | | 85 |
| s-PEEK-STOBA proton exchange membrane (28) | | | | 20 | | 80 |
| s-PEEK-STOBA proton exchange membrane (29) | | | | 30 | | 70 |

TABLE 1-continued

The composition of various proton exchange membranes containing STOBA within various weight %.

| | STOBA | | | | | s-PEEK |
|---|---|---|---|---|---|---|
| | Example 1 (wt %) | Example 2 (wt %) | Example 3 (wt %) | Example 4 (wt %) | Example 5 (wt %) | (dissolved in the NMP) wt % |
| s-PEEK-STOBA proton exchange membrane (30) | | | | | 40 | 60 |

A scraper with a gap of 400 um was used to coat the s-PEEK-STOBA solutions as disclosed in Table 1 onto a glass substrate with a coating speed of 17.8 cm/minutes, which was then placed into an oven set at 60° C. for 45 minutes to bake into a membrane. After filming, the temperature was increased to 110° C. and vacuum was applied to remove residual solvent. Finally, the produced s-PEEK-STOBA membrane was soaked in 60° C., 0.5M sulfuric acid for 1 hour, and later transferred to 80-90° C. deionized water to obtain an aqueous solution with pH>6. The obtained yellowish transparent s-PEEK-STOBA membrane had a thickness of 25 to 35 um.

Comparative Example 2

An s-PI Proton Exchange Membrane

A scraper with a gap of 400 um was used to coat the SPI-MCL-1 solution as disclosed in Example 7 onto a glass substrate with a coating speed of 17.8 cm/minutes, which was then placed into an oven set at 60° C. for 45 minutes to bake into a membrane. After filming, the temperature was increased to 110° C. and vacuum was applied to remove residual solvent. Finally, the produced s-PEEK membrane was soaked in 60° C., 0.5M sulfuric acid for 1 hours, and later transferred to 60° C. deionized water to obtain an aqueous solution with pH>6. After baking for 24 hrs, the brownish transparent s-PI membrane with a thickness of 20 to 25 um was obtained.

Example 9

An s-PI-STOBA Proton Exchange Membrane

The STOBA disclosed in Examples 1-5 were respectively mixed with the sPI-MCL-1 disclosed in Example 7 with the molar ratio as disclosed in Table 2, obtaining brownish opaque s-PI-STOBA solutions.

TABLE 2

The composition of various proton exchange membranes containing STOBA within various weight %.

| | STOBA | | | | | SPI-MCL-1 |
|---|---|---|---|---|---|---|
| | Example 1 (wt %) | Example 2 (wt %) | Example 3 (wt %) | Example 4 (wt %) | Example 5 (wt %) | (wt %) |
| s-PI-STOBA proton exchange membrane (1) | 5 | | | | | 95 |
| s-PI-STOBA proton exchange membrane (2) | 10 | | | | | 90 |
| s-PI-STOBA proton exchange membrane (3) | 15 | | | | | 85 |
| s-PI-STOBA proton exchange membrane (4) | 18 | | | | | 80 |
| s-PI-STOBA proton exchange membrane (5) | 30 | | | | | 70 |
| s-PI-STOBA proton exchange membrane (6) | 40 | | | | | 60 |
| s-PI-STOBA proton exchange membrane (7) | | 5 | | | | 95 |

TABLE 2-continued

The composition of various proton exchange membranes containing STOBA within various weight %.

| | STOBA | | | | | |
| --- | --- | --- | --- | --- | --- | --- |
| | Example 1 (wt %) | Example 2 (wt %) | Example 3 (wt %) | Example 4 (wt %) | Example 5 (wt %) | SPI-MCL-1 (wt %) |
| s-PI-STOBA proton exchange membrane (8) | | 10 | | | | 90 |
| s-PI-STOBA proton exchange membrane (9) | | 15 | | | | 85 |
| s-PI-STOBA proton exchange membrane (10) | | 18 | | | | 82 |
| s-PI-STOBA proton exchange membrane (11) | | 20 | | | | 80 |
| s-PI-STOBA proton exchange membrane (12) | | 30 | | | | 70 |
| s-PI-STOBA proton exchange membrane (13) | | 40 | | | | 60 |
| s-PI-STOBA proton exchange membrane (14) | | | 5 | | | 95 |
| s-PI-STOBA proton exchange membrane (15) | | | 10 | | | 90 |
| s-PI-STOBA proton exchange membrane (16) | | | 15 | | | 85 |
| s-PI-STOBA proton exchange membrane (17) | | | 20 | | | 80 |
| s-PI-STOBA proton exchange membrane (18) | | | 30 | | | 70 |
| s-PI-STOBA proton exchange membrane (19) | | | 40 | | | 60 |
| s-PI-STOBA proton exchange membrane (20) | | | | 5 | | 95 |
| s-PI-STOBA proton exchange membrane (21) | | | | 10 | | 90 |
| s-PI-STOBA proton exchange membrane (22) | | | | 15 | | 85 |
| s-PI-STOBA proton exchange membrane (23) | | | | 20 | | 80 |
| s-PI-STOBA proton exchange membrane (24) | | | | 30 | | 70 |
| s-PI-STOBA proton exchange membrane (25) | | | | 40 | | 60 |

TABLE 2-continued

The composition of various proton exchange membranes containing STOBA within various weight %.

| | STOBA | | | | | |
| --- | --- | --- | --- | --- | --- | --- |
| | Example 1 (wt %) | Example 2 (wt %) | Example 3 (wt %) | Example 4 (wt %) | Example 5 (wt %) | SPI-MCL-1 (wt %) |
| s-PI-STOBA proton exchange membrane (26) | | | | | 5 | 95 |
| s-PI-STOBA proton exchange membrane (27) | | | | | 10 | 90 |
| s-PI-STOBA proton exchange membrane (28) | | | | | 15 | 85 |
| s-PI-STOBA proton exchange membrane (29) | | | | | 20 | 80 |
| s-PI-STOBA proton exchange membrane (30) | | | | | 30 | 70 |
| s-PI-STOBA proton exchange membrane (31) | | | | | 40 | 60 |

A scraper with a gap of 400 um was used to coat the s-PI-STOBA solutions as disclosed in Table 1 onto a glass substrate with a coating speed of 17.8 cm/minutes, which was then placed into an oven set at 60° C. for 45 minutes to bake into a membrane. After filming, the temperature was increased to 110° C. and vacuum was applied to remove residual solvent. Finally, the produced s-PI-STOBA membrane was soaked in 60° C., 0.5M sulfuric acid for 1 hour, and later transferred to 80-90° C. deionized water to obtain an aqueous solution with pH>6. After baking for 24 hrs, the brownish transparent s-PI membrane with a thickness of 20 to 25 um was obtained.

Characteristic Measurements of Proton Exchange Membrane

Example 10

Electrical Conductivity

The electrical conductivity of the Nafion 112, the s-PEEK membrane disclosed in Comparative Example 1, the s-PEEK-STOBA proton exchange membrane (10) disclosed in Example 8, the s-PI membrane disclosed in Comparative Example 2, and the s-PI-STOBA proton exchange membrane (10) disclosed in Example 9 were measured respectively by IN-PLANE field pulses and the results are shown in Table 3.

TABLE 3

The electrical conductivity of the Naffion 112, sPEEK-STOB, Spi and sPI-STOBA proton exchange membranes in various temperatures.

| | Nafion 112 | s-PEEK (Comparative Example 1) | s-PEEK-STOBA proton exchange membrane (10) | s-PI (Comparative Example 2) | s-PI-STOBA proton exchange membrane (10) |
| --- | --- | --- | --- | --- | --- |
| electrical conductivity (25□) | $2.7 \times 10^{-2}$ S/cm | $6 \times 10^{-2}$ S/cm | $3 \times 10^{-2}$ S/cm | $2.5 \times 10^{-1}$ S/cm | $2 \times 10^{-2}$ S/cm |
| electrical conductivity (80□) | $1 \times 10^{-1}$ S/cm | fusing | $1.0 \times 10^{-1}$ S/cm | $1 \times 10^{-1}$ S/cm | $3 \times 10^{-1}$ S/cm |
| electrical conductivity (100□) | fusing | fusing | $1.2 \times 10^{-1}$ S/cm | fusing | $5 \times 10^{-1}$ S/cm |
| electrical conductivity (120□) | fusing | fusing | $1 \times 10^{-2}$ S/cm | fusing | $2.5 \times 10^{-1}$ S/cm |

As shown in Table 3, the s-PEEK-STOBA proton exchange membrane and the s-PI proton exchange membrane exhibited superior electrical conductivity than the s-PEEK or the s-PI membrane resulting from the addition of the STOBA.

Example 11

Water Retention Ability of the s-PEEK-STOBA

The s-PEEK-STOBA proton exchange membrane (10) disclosed in Example 8 was measured via TGA (therapeutic goods administration) and the water retention contributions (per unit weight) of the sulfonic groups, the STOBA moieties, the PEEK moieties, and the BMI moieties were as shown in Table 4:

TABLE 4

The water retention contribution of part components of sPEEK-STOBA proton exchange membrane containing about free water and bound water.

| | water retention contribution | | | |
|---|---|---|---|---|
| | sulfonic group | STOBA moiety | PEEK moiety | BMI moiety |
| free water | 5.7614 | 0.1904 | −0.5438 | −1.8956 |
| bound water | 0.1429 | 0.0956 | −0.0568 | −0.4771 |

Note that the water retention contributions measured below 100° C. was defined as the weight of free water, and the water retention contributions measured between 100-200° C. was defined as the weight of bound water As shown in Table 4, the STOBA exhibited superior water retention ability higher than the —$SO_3H$, the PEEK, and the BMI (bismaleimide monomer) due to the intramolecular hydrogen bond formation between the STOBA and water.

Example 12

Measurement of Mechanical Strength

The tensile strength and extension of the Nafion 112, the s-PEEK membrane disclosed in Comparative Example 1, the s-PEEK-STOBA proton exchange membrane (10) disclosed in Example 8, the s-PI membrane disclosed in Comparative Example 2, and the s-PI-STOBA proton exchange membrane (10) disclosed in Example 9 were measured and the results are shown in Table 5.

TABLE 5

Comparison of mechanical properties of the Naffion 112, sPEEK-STOB, Spi and sPI-STOBA proton exchange membranes.

| | Nafion 112 | s-PEEK (Comparative Example 1) | s-PEEK-STOBA proton exchange membrane (10) | s-PI (Comparative Example 2) | s-PI-STOBA proton exchange membrane (10) |
|---|---|---|---|---|---|
| thickness (μm) | 54 | 25 | 42 | 26 | 26 |
| tensile strength (Kgf/mm$^2$) | 2.25 | 4.94 | 5.87 | 2.69 | 4.22 |
| Extension (%) | 103.3 | 5.48 | 5.28 | 5.00 | 6.37 |

As shown in Table 5, the s-PEEK-STOBA proton exchange membrane and the s-PI proton exchange membrane exhibited superior tensile strength and extension than the s-PEEK or the s-PI resulting from the addition of the STOBA. Further, the proton exchange membrane having the STOBA exhibited a tensile strength of twice that of the Nafion 112 membrane.

Example 13

Measurement of Dimensional Changes

The Nafion 112, the s-PEEK membrane disclosed in Comparative Example 1, the s-PEEK-STOBA proton exchange membrane (10) disclosed in Example 8, the s-PI membrane disclosed in Comparative Example 2, and the s-PI-STOBA proton exchange membrane (10) disclosed in Example 9 were immersed in boiling water (100° C.) for 90 minutes. After cooling, the dimensional changes thereof were measured and the results are shown in Table 6.

TABLE 6

Comparison of three axial length changes of the Naffion 112, sPEEK-STOB, Spi and sPI-STOBA proton exchange membranes.

| | Nafion 112 | s-PEEK (Comparative Example 1) | s-PEEK-STOBA proton exchange membrane (10) | s-PI (Comparative Example 2) | s-PI-STOBA proton exchange membrane (10) |
|---|---|---|---|---|---|
| ΔL | 17% | X | 5% | 2.5% | 3.75% |
| ΔW | 3% | X | 10% | 12% | 0% |
| ΔT | 12% | X | 19% | 53.9% | 4.5% |
| property changes | softening | fusing | — | brittlement | — |

Note that ΔL represented the dimensional change in length; ΔW represented the dimensional change in width; and ΔT represented the dimensional change in thickness As shown in Table 3, the s-PEEK-STOBA proton exchange membrane and the s-PI proton exchange membrane exhibited superior dimensional stability and overcame the brittlement problems of the s-PI or the s-PEEK. Further, the proton exchange membrane having the STOBA of the invention exhibited minimal swelling after being immersed in boiling water (100° C.) for 90 minutes.

Figure 4:
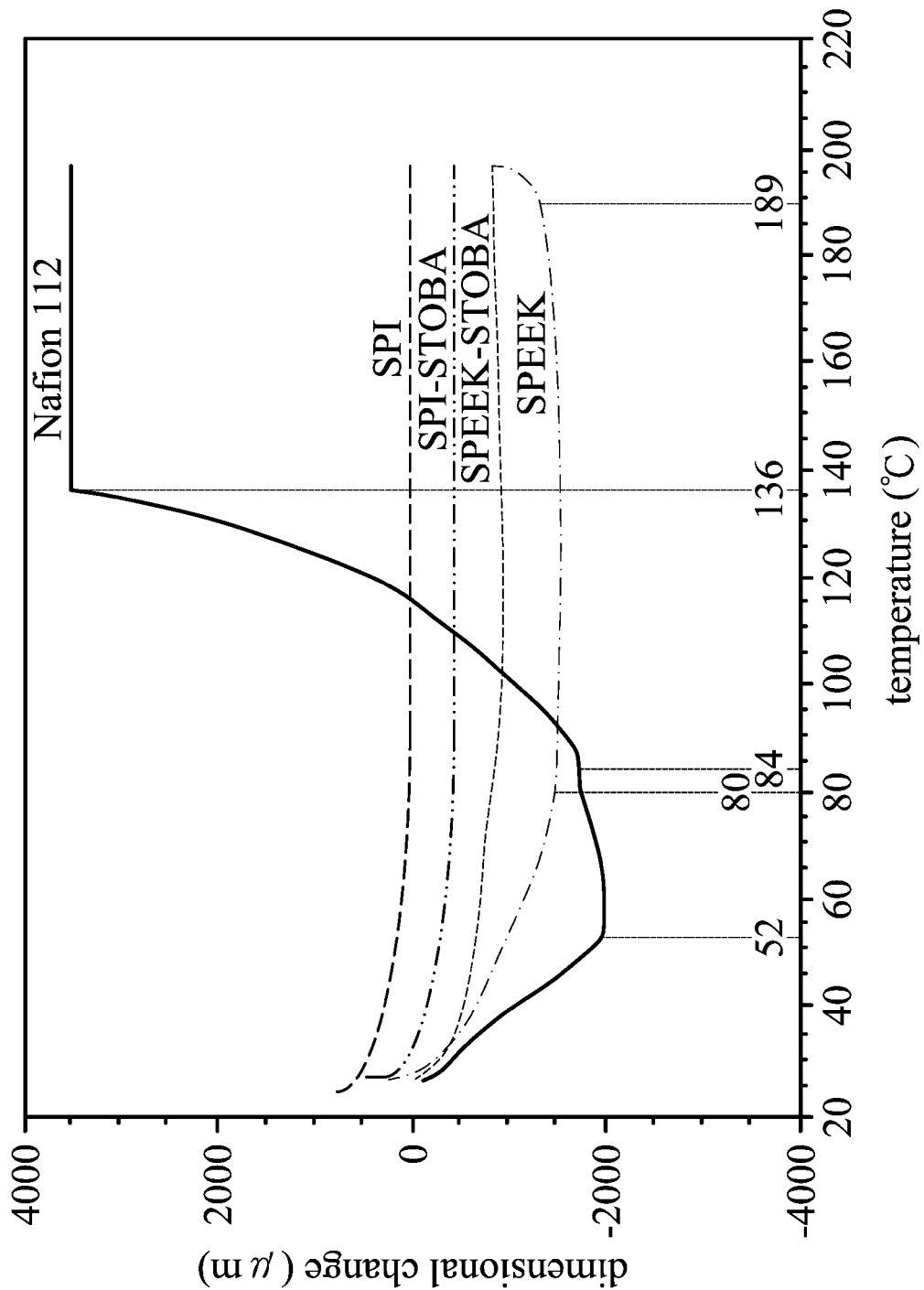
FIG. 4 is a TMA (thermal mechanical analyzer) spectrum of membranes as disclosed in Example 13.

Next, the dimensional changes of the Nafion 112, the s-PEEK membrane disclosed in Comparative Example 1, the s-PEEK-STOBA proton exchange membrane (10) disclosed in Example 8, the s-PI membrane disclosed in Comparative Example 2, and the s-PI-STOBA proton exchange membrane (10) disclosed in Example 9 were measured by a thermal mechanical analyzer (TMA) (with a stretching force of 0.5N) and the results are shown in FIG. 4. Accordingly, the Nafion 112 exhibited inferior dimensional stability over 80° C. To the contrary, the proton exchange membrane having the STOBA of the invention exhibited superior dimensional stability at high temperatures.

Example 14

Measurement of Water Retention Ability

The Nafion 117, the s-PEEK membrane disclosed in Comparative Example 1, and the s-PEEK-STOBA proton exchange membrane (10) disclosed in Example 8 were immersed in water at 60° C. for 6 hr and then at 25° C. for 10 minutes. After drying, the dimensional changes thereof were measured by a jump-isothermal TGA and the results are shown in Table 7.

TABLE 7

Comparison of water up-take of the Naffion 112, sPEEK-STOB, Spi and sPI-STOBA proton exchange membranes.

|  | Nafion 117 | s-PEEK (Comparative Example 1) | s-PEEK-STOBA proton exchange membrane (10) |
| --- | --- | --- | --- |
| weight gains (%) | 16.3 | 25.23 | 29.36 |
| water-absorption per weight unit(%) | 21.12 | 35.35 | 43.04 |

Accordingly, the proton exchange membrane having the STOBA of the invention exhibited superior water retention ability than that of the Nafion 117. Further, the STOBA prevented hydrogen sulfate groups from leaking out the s-PEEK.

Example 15

Membrane Electrode Assembly Fuel Cell

Figure 5:
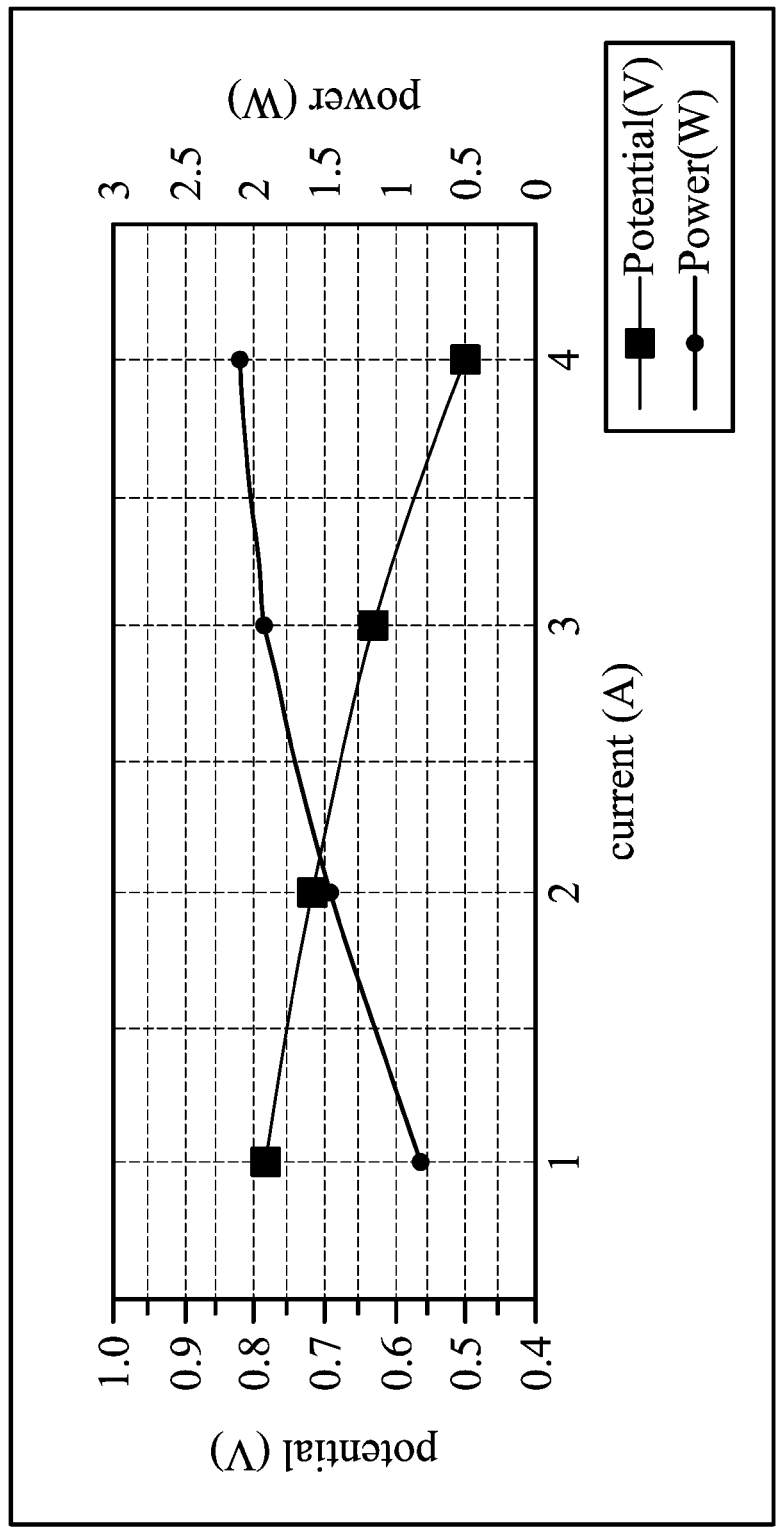
FIG. 5 is a graph plotting voltage and power variation against current of the fuel cell disclosed in Example 15.

A membrane electrode assembly having the s-PI-STOBA proton exchange membrane (10) disclosed in Example 9 as proton exchange membrane and a pair of electrodes (E-TEK Carbon Cloth with Pt/XC-72 (0.4 mg/cm$^2$) as catalyst) was provided. The voltage and power of the fuel cell employing the aforementioned membrane electrode assembly were measured under different currents. The results are shown in FIG. 5.

Accordingly, the proton exchange membrane made of the composition of the invention (STOBA & the s-PEEK or the STOBA & the s-PI) exhibit higher water retention ability, and mechanical strength than the conventional s-PEEK or the s-PI membranes. Further, the proton exchange membrane exhibited high dimensional stability when immersed in boiling water due to the main component the STOBA. Therefore, the proton exchange membrane of the invention exhibited minimal swelling and brittleness even when exposed to 100° C. and 100% RH.

Moreover, in comparison with the conventional Nafion 112, the proton exchange membrane of the invention exhibited higher water retention ability and mechanical strength and did not soften or become brittle. The proton exchange membranes of the invention had an electrical conductivity of $1\times10^{-2}$~$5\times10^{-2}$ S/cm at 25° C. similar to the Nafion film, and had an electrical conductivity of $1\times10^{-1}$~$5\times10^{-1}$ S/cm at 120° C.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A proton exchange membrane composition, comprising: a hyper-branched polymer, wherein the hyper-branched polymer has a degree of branching of more than 0.5; and a polymer with ion conductivity distributed uniformly over the hyper-branched polymer, wherein the polymer with ion conductivity comprises Nafion, sulfonated poly (ether ether ketone) (s-PEEK), sulfonated polyimides (s-PI), phosphoric acid/polybenzimidazole polymer (p-PBI), sulfonated poly(phenylene oxide) (s-PPO), sulfonated poly(arylene ether sulfone) (s-PES), or sulfonated poly(4-phenoxybenzoyl-1,4-phenylene) (S-PPBP), and wherein the hyper-branched polymer has a weight ratio equal to or more than 5 wt %, based on a solid content of the proton exchange membrane composition.

2. The proton exchange membrane composition as claimed in claim 1, wherein the hyper-branched polymer comprises a polymer prepared by polymerizing a bismaleimide-containing compound with a barbituric acid.

3. The proton exchange membrane composition as claimed in claim 2, wherein the molar ratio of the bismaleimide-containing compound and barbituric acid is 20:1 to 1:5.

4. The proton exchange membrane composition as claimed in claim 2, wherein the molar ratio of the bismaleimide-containing compound and barbituric acid is 5:1 to 1:2.

5. The proton exchange membrane composition as claimed in claim 2, wherein the bismaleimide-containing compound comprises substituted or unsubstituted bismaleimide monomer or substituted or unsubstituted bismaleimide oligomer.

6. The proton exchange membrane composition as claimed in claim 2, wherein the bismaleimide-containing compound comprises

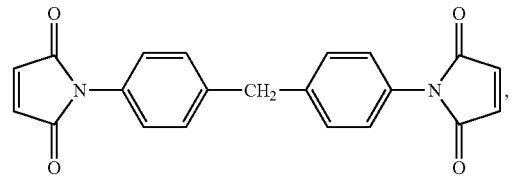

-continued

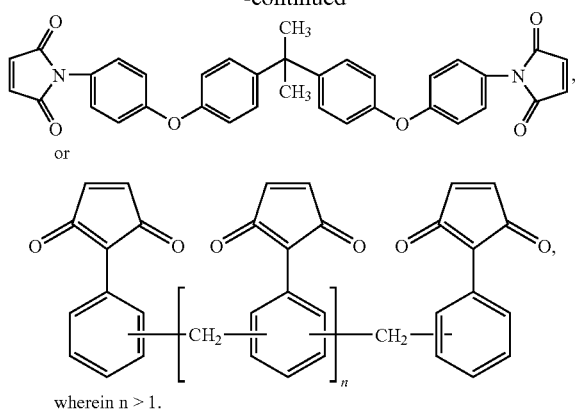

wherein n > 1.

7. The proton exchange membrane composition as claimed in claim 1, wherein the hyper-branched polymer has a weight ratio of 1-30 wt %, based on the solid content of the proton exchange membrane composition.

8. The proton exchange membrane composition as claimed in claim 1, wherein the hyper-branched polymer has a weight ratio of 5-25 wt %, based on the solid content of the proton exchange membrane composition.

9. The proton exchange membrane composition as claimed in claim 1, further comprising a catalyst.

10. The proton exchange membrane composition as claimed in claim 9, wherein the catalyst comprises platinum, ruthenium, or platinum-ruthenium alloy.

11. The proton exchange membrane composition as claimed in claim 1, wherein a proton exchange membrane made from the proton exchange membrane composition possesses an operating temperature of between 25° C. to 150° C.

* * * * *